United States Patent [19]

Wallin et al.

[11] Patent Number: 4,867,364

[45] Date of Patent: Sep. 19, 1989

[54] NAIL FEEDING APPARATUS FOR PALLET-MAKING MACHINE

[75] Inventors: Roger W. Wallin, St. Francis, Minn.; Jack Gresham, Armuchee, Ga.

[73] Assignee: Viking Engineering & Development, Inc., Fridley, Minn.

[21] Appl. No.: 331,057

[22] Filed: Mar. 28, 1989

Related U.S. Application Data

[63] Continuation of Ser. No. 90,872, Aug. 28, 1987, abandoned.

[51] Int. Cl.[4] ......................... B65G 57/16; B27F 7/02

[52] U.S. Cl. ......................................... 227/7; 227/116; 221/165

[58] Field of Search ................... 227/7, 109, 112, 116, 227/114, 115, 117, 118, 135; 221/10, 165, 166

[56] References Cited

U.S. PATENT DOCUMENTS

| | | | |
|---|---|---|---|
| 2,732,553 | 1/1956 | Bensemann | 227/109 |
| 2,856,606 | 10/1958 | Richards | 227/109 |
| 3,207,403 | 9/1965 | Stoddard et al. | 227/109 X |
| 3,265,273 | 8/1966 | Janus | 227/116 X |
| 3,273,776 | 9/1966 | Bryson | 227/109 |
| 3,945,549 | 3/1976 | Colson | 227/45 |
| 4,054,236 | 10/1977 | Paxton | 227/45 |
| 4,093,111 | 6/1978 | Katoh | 227/45 X |
| 4,503,993 | 3/1985 | Ginnow et al. | 227/117 X |

*Primary Examiner*—Douglas D. Watts
*Assistant Examiner*—James L. Wolfe
*Attorney, Agent, or Firm*—Kinney & Lange

[57] ABSTRACT

Bulk nails from a single outlet track of a vibrating feedbowl are selectively diverted into a plurality of nail tracks. During each nailing operation of a pallet-making machine, one nail from each track is picked from the track and delivered to a nail-driving chuck. The presence of nails in the track is sensed, and the selective filling of the tracks is based upon the presence or absence of nails in the individual tracks.

13 Claims, 5 Drawing Sheets

NAIL FEEDING APPARATUS FOR PALLET-MAKING MACHINE

This is a continuation of application Ser. No. 090,872, filed on Aug. 28, 1987, abandoned as of the date of this application.

Reference is made to a copending application entitled "COMPENSATING NAIL-DRIVING CHUCK FOR PALLET-MAKING MACHINE", Ser. No. 086,937, filed Aug. 17, 1987, now Pat. No. 4,782,989 and assigned to the same assignee as the present application.

BACKGROUND OF THE INVENTION

1. Field of the Invention.

The present invention relates to pallet-making machines, and in particular to nail-driving chucks for use in a pallet-making machine.

2. Description of the Prior Art.

Wooden pallets, as they are known today, first came into widespread use during World War II as a result of the need of the United States Navy to move large amounts of goods in short periods of time with forklift trucks. The usage of wooden pallets has increased every year since that time.

In 1987, it is projected that about 380 million new wooden pallets will be built in the United States. Pallets consume about twenty percent of the lumber that is used in the United States annually. The manufacture of pallets is second only to the construction industry and is ahead of all other industries in the use of lumber. Wooden pallets consume about fifty percent of the hardwood lumber used annually in the United States.

To satisfy the high demand for wooden pallets, machines have been developed which manufacture pallets on a semi-automatic or automatic basis. An example of automated pallet-making equipment is shown in the Colson U.S. Pat. No. 3,945,549.

The Colson patent shows a type of pallet-making machine which uses a special vibrating bowl to feed bulk nails to picker mechanisms, which individually feed the nails to chucks. Each time a nailing operation is to take place, a ram drives the nail being held by the chuck into the boards located below the chuck. The special vibrating bowl, which feeds bulk nails to several different chucks, has been found to be very difficult to implement in practice.

An alternative approach for feeding bulk nails is to use a separate vibrating bowl for each chuck. While this simplifies the construction of the bowl, it greatly increases the cost of the machine because three or four vibrating bowls, with their associated drive mechanisms, must be provided.

The other common approach for pallet-making machines has been to use collated nails (i.e. nails which are carried by or attached to a flexible strip). The strip is fed to a nail gun which fires the nail into the wood at a very high velocity using air for power.

The use of a nail gun and collated nails has several significant disadvantages. First, the cost of collated nails is several times that of bulk nails. Second, nail guns, which rely on firing a nail into the wood at very high velocity, are prone to board splitting. In addition, because the nail gun is typically hand-held by the operator, nail placement is not repeatable.

SUMMARY OF THE INVENTION

The present invention is a nail feeding apparatus which feeds bulk nails from a single outlet track of a vibrating feedbowl to a plurality of nail driving chucks. The nail-feeding apparatus includes a guide wall with a plurality of nail tracks (one for each chuck) which guide nails from a first end adjacent the feedbowl outlet track to a second end adjacent a nail picker. During each nailing operation, the nail pick picks an individual nail from each track. The individual nails which have been picked are delivered to each of the chucks, and are driven into the pallet.

The nail feeding apparatus also includes nail sensing means for sensing nails in the tracks and means for causing relative movement of the guide with respect to the outlet track of the vibrating feedbowl based upon signals from the nail sensing means. In this way, all of the nail tracks are filled from a single outlet track of the vibrating bowl.

DETAILED DESCRIPTION OF THE PREFERRED EMBODIMENTS

Figure 1:
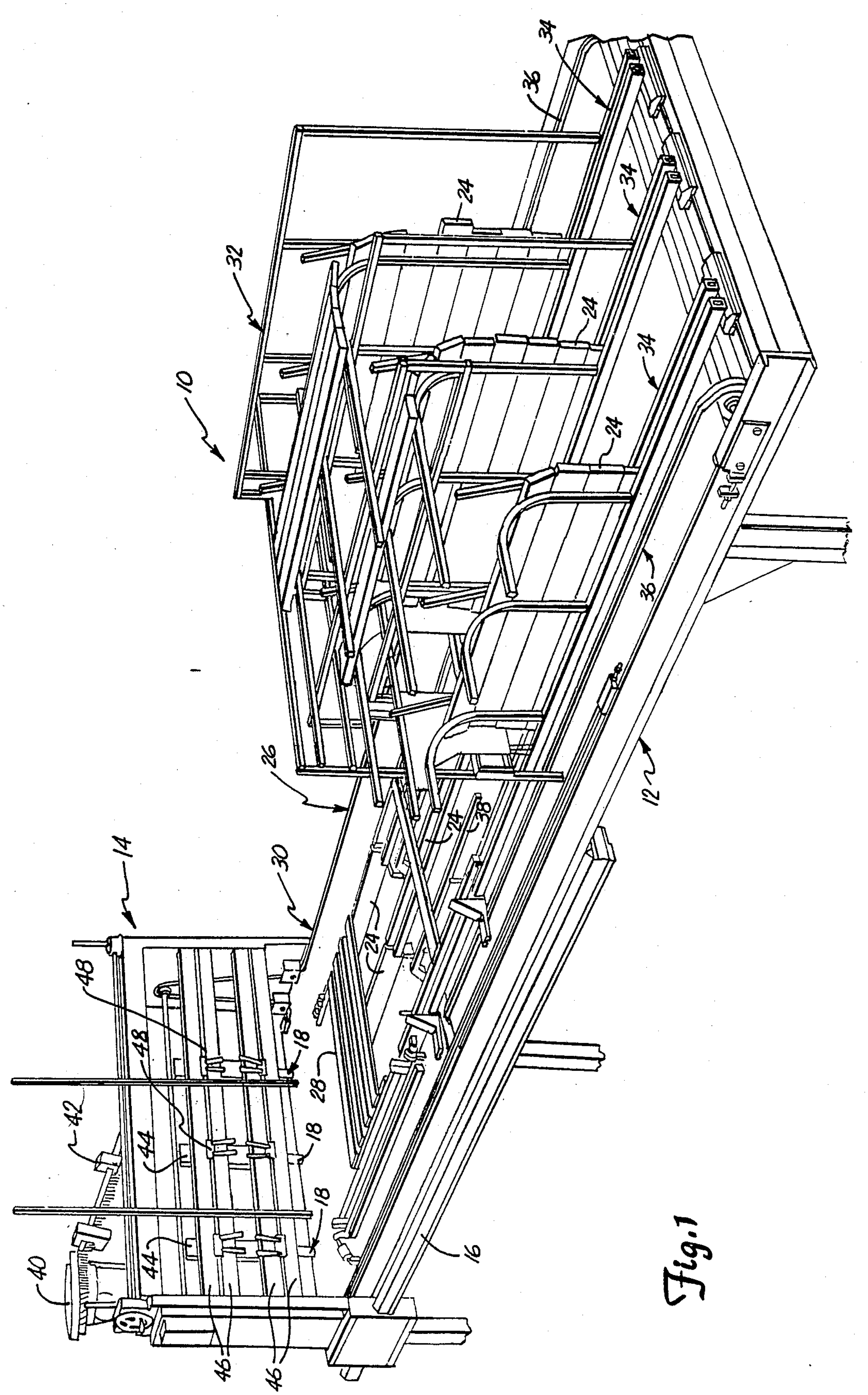
FIG. 1 is a perspective view of a pallet making machine including the nail feeding apparatus of the present invention.

Pallet-making machine 10 shown in FIG. 1 is an automated machine which can be operated by a single person, and which is capable of producing pallets at a rate of approximately one finished pallet per minute. Machine 10 has a bed or frame 12 which is stationary and a traveling bridge 14 which moves longitudinally on rails 16, which are attached to frame 12. Travelling bridge 14 carries nail-driving chucks 18 which drive the nails which hold together the assembled pallets. The actuation of nail-driving chucks 18 is controlled by a microcomputer control system located within a control panel (not shown) based upon signals from board sensors 20 (not shown) which are carried by traveling bridge 14.

During each operating cycle, two pallets normally are being assembled. A first pallet is having bottom deck boards 22 attached to stringers 24 at first station 26, while a second pallet is having top deck boards 28 attached to stringers 24 at second station 30. Stringers 24 are fed out of delivery racks 32 along tracks 34 to first station 26. The advancing of stringers 24 is provided by a chain drive 36 with stringer-pushing dogs (not shown).

When stringers 24 are in position at first station 26, chain drive 36 stops and the operator then places top deck boards 28 across stringers 24 at second station 30 and then places bottom deck boards 22 across stringers 24 at first station 26.

Traveling bridge 14 then is advanced along rails 16 toward racks 32. As bridge 14 travels over top deck boards 28 at second station 30, nail-driving chucks 18 are actuated to drive nails into top deck boards 28 to fasten top deck boards 28 and stringers 24 together. Similarly, as traveling bridge 14 moves over bottom deck boards 22 at first station 26, chucks 18 are actuated to drive nails into bottom boards 22.

When traveling bridge 14 reaches the end of its travel, it reverses direction and returns to its home position which is shown in FIG. 1. The completed pallet is driven from second station 30 to a stacking station (not shown) located behind the home position of bridge 14. The semi-finished pallet with the bottom deck boards 22 attached is flipped over by flippers 38 and positioned at second station 30. In the meantime, a new set of stringers 24 are advanced from racks 32 to first station 26 by chain drive 36.

During each operating cycle, therefore, a first pallet is being partially completed at first station 26, a second pallet is being completed at second station 30, and a third pallet is being stacked at the stacking station (not shown). The operator need only provide the deck boards at stations 26 and 30, and machine 10 forms all of the nailing operations, as well as the advancing of stringers 22, flipping of the semi-finished pallet, and stacking of the finished pallets.

In the embodiment of pallet-making machine 10 shown in FIG. 1, nails are provided to the nail-driving chucks 18 one at a time from a bulk nail supply system. Bulk nails are fed from a common feedbowl 40 through a multichannel pick mechanism 42 to the individual chucks 18. Feedbowl 40 and pick mechanism 42 are carried on traveling bridge 14. Operation of chucks 18 is described in detail in the above-mentioned copending application, and that description is incorporated by reference.

FIGS. 2-8 show the nail-feeding apparatus of the present invention, which includes feedbowl 40 and pick mechanism 42, in further detail.

Figure 2:
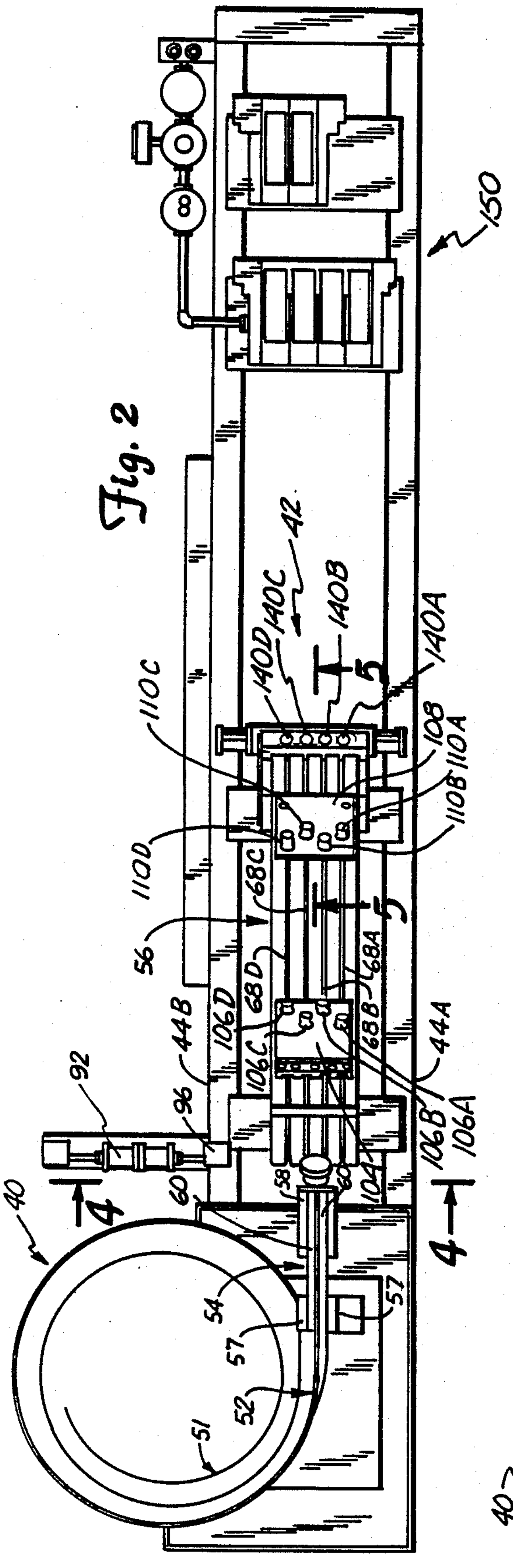
FIG. 2 is a top view of the nail feeding apparatus.
Figure 3:
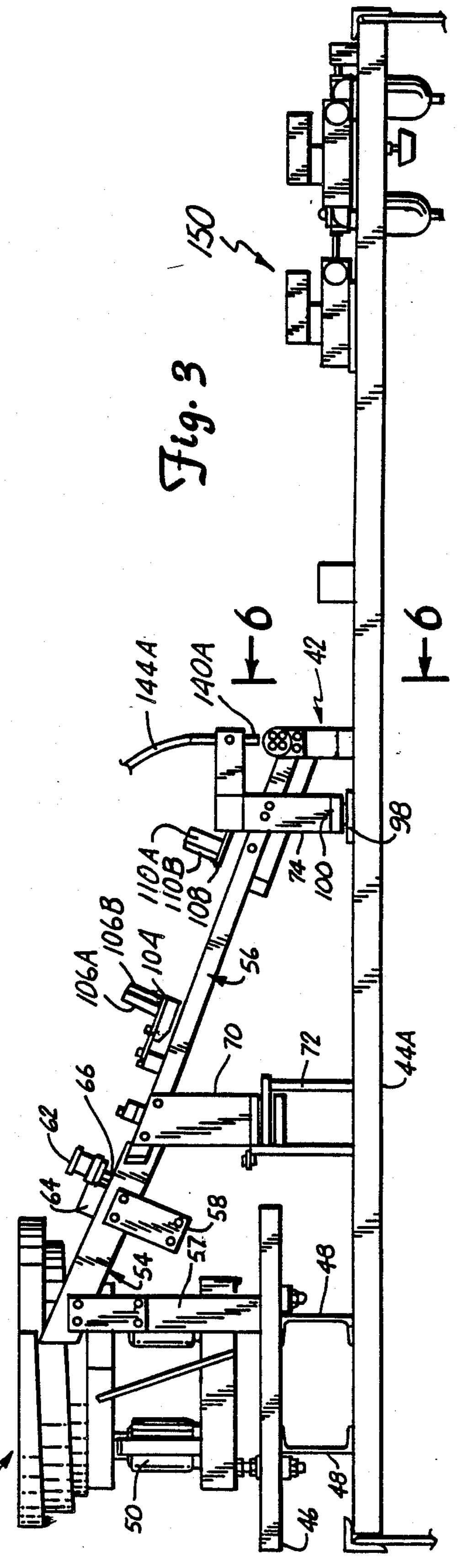
FIG. 3 is a front view of the nail feeding apparatus.

As shown in FIGS. 2 and 3, traveling bridge 14 includes a pair of parallel support bars 44A and 44B which support the nail-feeding apparatus. Nail tray 46 is supported above support bars 44A and 44B by channel members 48. Nail tray 46 (with appropriate vibration damping) supports power unit 50, which provides the vibratory drive to feedbowl 40 to cause bulk nails to climb the spiral track 51 to outlet 52 of feedbowl 40.

Upper nail track 54 receives nails at outlet 52 and guides them downwardly toward multitrack guide 56. Upper nail track 54 is supported by nail track supports 57, which are attached at their lower end to nail tray 46. Spacer 58 is attached to upper nail track 54 to define the spacing between guide bars 60 which form track 54.

Pneumatic cylinder 62 is mounted on cylinder support 64, which is attached to spacer 58. Cylinder 62 has a movable plunger or shaft 66, as shown in FIG. 3. Plunger 66 is shown in its down position, where it blocks the passage of nails along upper track 54. When cylinder 62 is actuated, plunger 66 is retracted, which allows nails to pass down track 54 and into multitrack guide 56.

Guide 56 defines four parallel nail tracks (or slots) 68A-68D for holding and guiding nails. At its upper end, guide 56 is supported by support slide 70 and pedestal 72. At its lower end, guide 56 is pivotally supported by pivot support 74.

Figure 4:
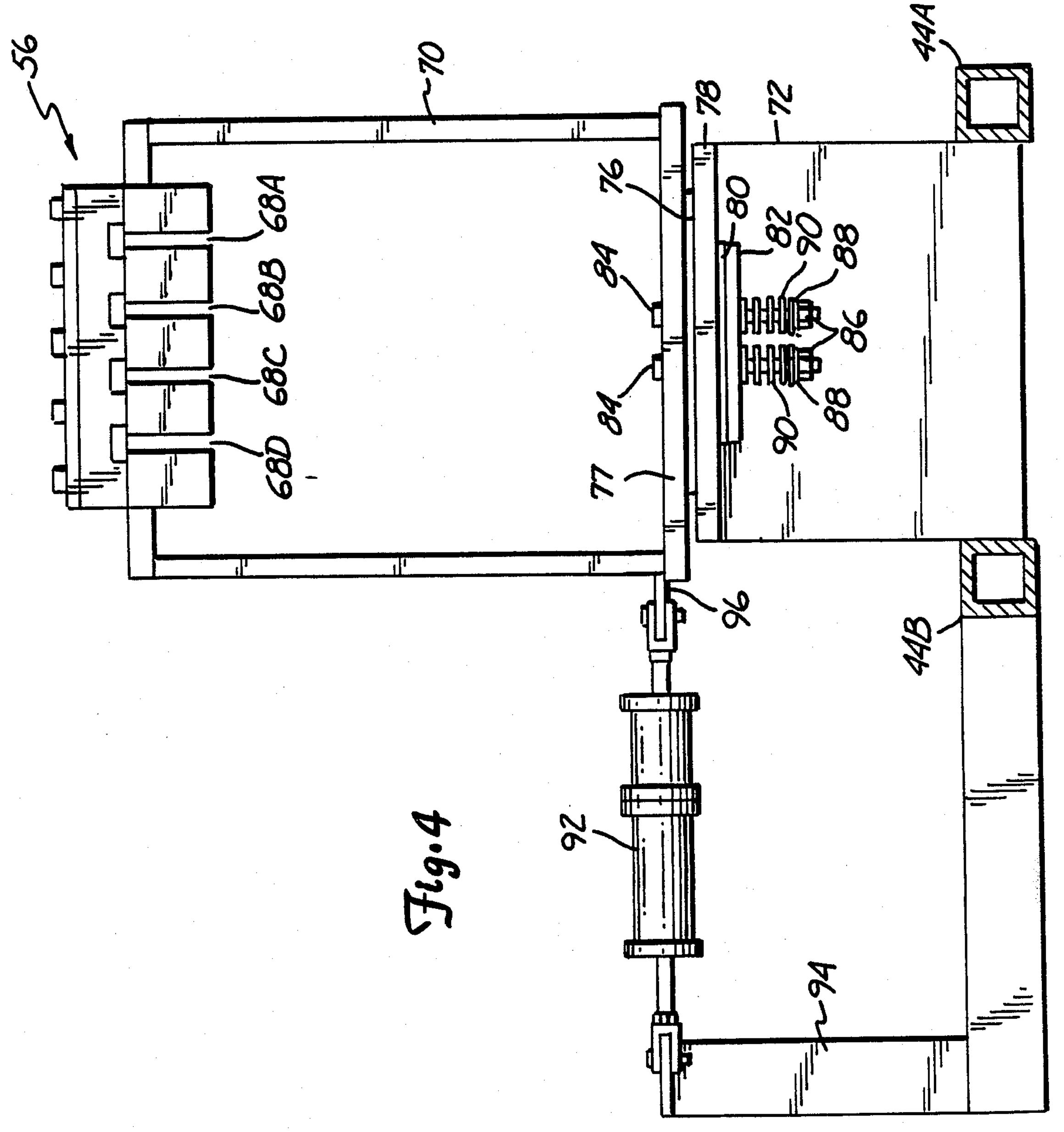
FIG. 4 is a sectional view along section 4-4 of FIG. 2.
Figure 5:
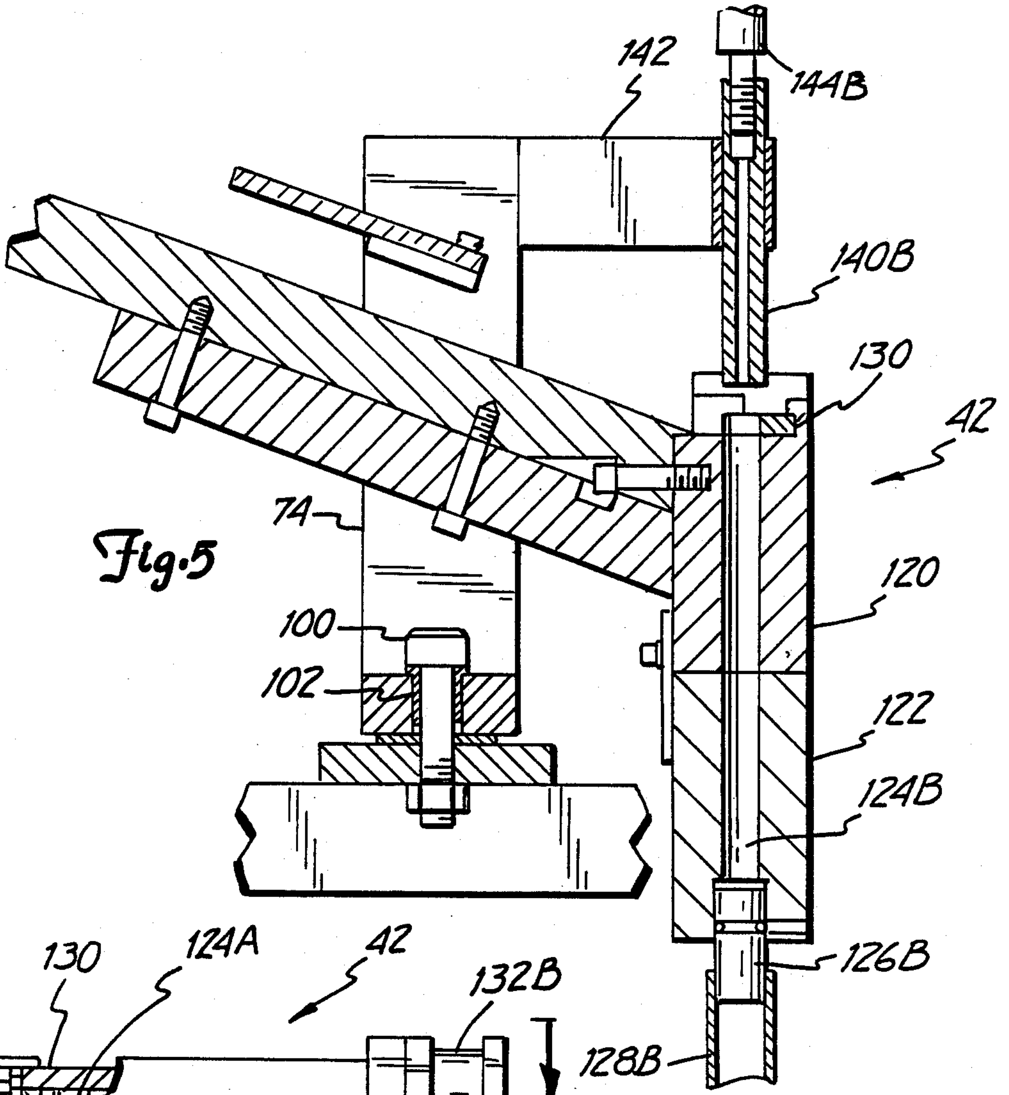
FIG. 5 is a sectional view along section 5-5 of FIG. 2.
Figure 6:
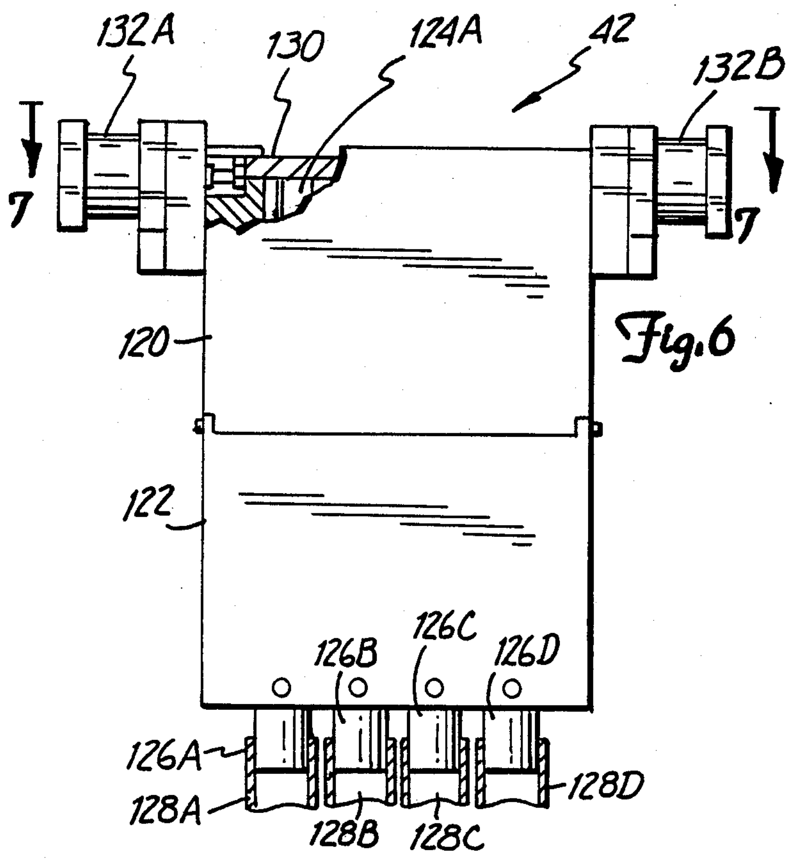
FIG. 6 is a sectional view along section 6-6 of FIG. 3.
Figure 7:
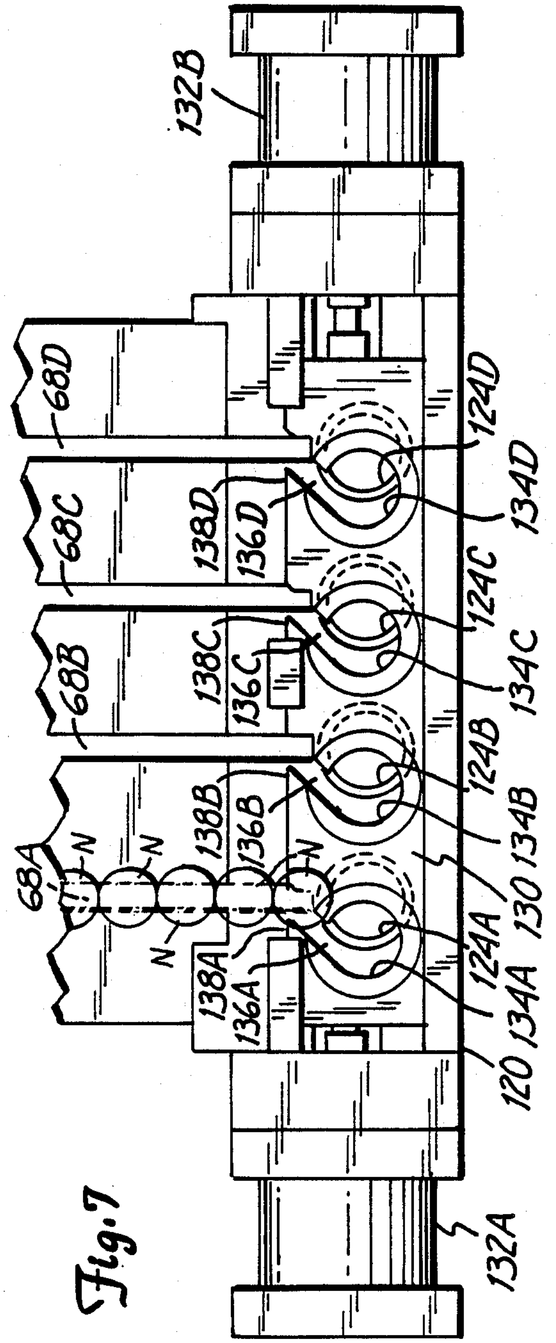
FIGS. 7 and 8 are sectional views along section 7-7 of FIG. 6, showing the picker plate in two different positions.

As best shown in FIG. 4, slide support 70 is slidably mounted on pedestal 72. Slide plate 76 is located between the bottom surface of bottom plate 77 of support 70 and the top surface of top plate 78 of pedestal 72. Mounted below top plate 78 of pedestal 72 is slide plate 80 and holder plate 82. Bolts 84, nuts 86, washers 88 and bias springs 90 hold together slide support 70 and pedestal 72 in sliding relationship. Slots in top plate 78 of pedestal 72 and in plates 80 and 82 permit sliding movement back and forth of support 70 with respect to pedestal 72.

Sliding movement of support 70 with respect to pedestal 72 is provided by pneumatic cylinder 92, which is connected at one end to support post 94 and at an opposite end to clevis eye 96, which is welded to slide support 70.

Pivot support 74 is pivotally connected to base plate 98, which is attached to and extends between supports 44A and 44B. Pivotal connection of support 74 to base plates 98 is provided by bolt 100 and bearing 102 (see FIG. 5).

Mounted above guide 56 is upper sensor support plate 104, which supports four nail proximity sensors 106A-106D. The presence of nails in tracks 68A-68D is sensed by sensors 106A-106D, respectively. When one of the sensors 106A-106D senses an absence of nails in its respective track, the control logic which operates cylinders 92 causes that particular track to be brought into alignment with upper track 54 so that nails can be fed from feedbowl 40 down upper track 54 and into the particular track 68A-68D which is aligned with upper track 54. Pneumatic cylinder 62 is then actuated to withdraw plunger 66 and allow nails to slide down upper track 54 and into the aligned track (68A, 68B, 68C or 68D) of guide 56. Plunger 66 and guide 56 remain in this position long enough to allow the selected track 68A-68D to fill with nails to near the upper end of guide 56. Plunger 66 then moves down to block further nail movement in upper track 54, and guide 56 can then be moved to the next appropriate position. By sensing the presence and absence of nails in tracks 68A-68D and controlling the position of guide 56 based upon the sensor signals, it is possible to keep tracks 68A-68D filled with an adequate supply of nails at all times.

Mounted above guide 56 just upstream from picker mechanism 42 is lower sensor support plate 108, which supports nail sensors 110A-110D. If any of the nail sensors 110A-110D does not sense the presence of a nail in its respective track 68A-68D, this is a potential malfunction, and machine 10 is automatically shut down.

Picker mechanism 42 is mounted at the lower end of guide 56. As shown in more detail in FIGS. 5-7, pick mechanism 42 includes an upper pick block 120 and lower pick block 122 which define four vertical passages 124A-124D corresponding to the four nail tracks 68A-68D, respectively. Mounted at the lower end of passages 124A-124D are nail chutes 126A-126D. Flexible delivery tubes 128A-128D are mounted on nail chutes 126A-126D, respectively, and connect the nail chutes with the respectively nail-driving chucks.

In the particular embodiment shown in FIG. 1, there are three chucks 18 being used. This means that one of the four tracks 68A-68D will be blocked and remain inactive during the manufacture of three-stringer pallets. When manufacturing four-stringer pallets, four nail-driving chucks are required, and all four nail tracks 68A-68D are used.

Top pick block 120 defines a slide in which picker plate 130 can reciprocate. Picker plate 130 is moved back and fourth by pneumatic cylinders 132A and 132B, which are mounted on opposite sides of top pick block 120.

Figure 8:
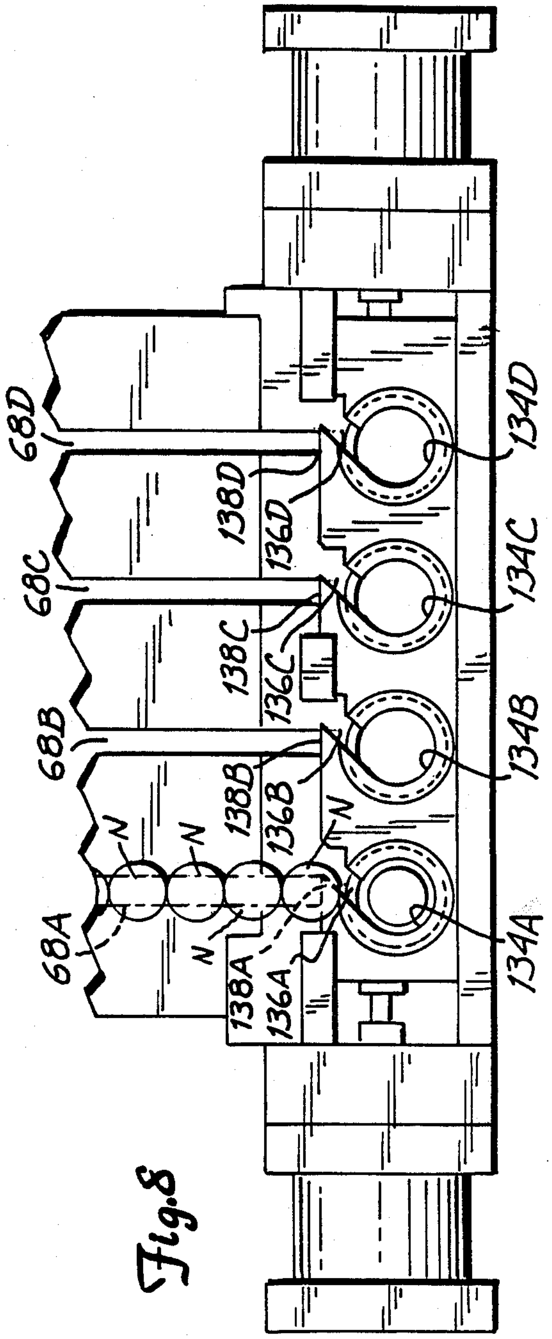

Picker plate 130 has four circular holes 134A–134D with communicating slots 136A–136D, respectively. In the position shown in FIG. 7, slots 136A–136D are out of alignment with tracks 68A–68D. As picker plate 130 moves to the right, as illustrated in FIG. 8, a nail N is permitted to pass from track 68A–68D into passages 124A–124D, respectively. The triangular portion 138A–138D of picker plate 130 prevents more than one nail from dropping into passages 124A–124D with each actuation and movement.

Air nozzles 140A–140D are provided to assist the movement of the nails N down through passages 124A–124D, out chutes 126A–126D, and through flexible delivery tubes 128A–128D to chucks 18. Nozzles 140A–140D are positioned immediately above passages 124A–124D, respectively, and are held in position by mounting bracket 142, which is attached to pivot support 74. A regulated source of pressurized air (not shown) is connected through flexible tube 144A–144D to nozzles 140A–140D, respectively, to provide a pulse of air through the nozzles to assist the gravity fall of the nails through the tubes. The air pulse is coordinated with and timed in duration and delay from the picker actuation to assure delivery of the nails to the chucks at the proper time with respect to activation of the chucks. Solenoid valves 150 control the supply of pressurized air to the pneumatic cylinders and to the nozzles.

The nail supply system of the present invention, as illustrated in FIGS. 2–8, provides a reliable supply of bulk nails individually to multiple chucks while using a single feedbowl. The pivotal multitrack guide 56, which is operated based upon sensor signals from sensors 106A–106D, ensures that each track 68A–68D is filled with an adequate supply of nails at all times. The picker assembly 42 supplies nails from the multiple track one at a time to the nail-driving chucks reliably, and within the short period of time necessary in order to achieve high speed operation of the pallet-making machine. The use of an air assist to blow the nails from the picker head down to the chucks 18 assists in the high speed and reliable operation of the nail supply system.

Although the present invention has been described with reference to preferred embodiments, workers skilled in the art will recognize that changes may be made in form and detail without departing from the spirit and scope of the invention.

What is claimed is:

1. In a pallet-making machine, a nail-feeding apparatus for feeding nails to a plurality of nail-driving chucks, the apparatus comprising:

feedbowl means for feeding nails in single file along a path to a single outlet track;

guide means having a plurality of nail tracks for guiding nails from a first end adjacent the outlet track to a second end;

nail delivery means for delivering individual nails to the chucks, including: hollow tubes connected to the chucks;

nail pick means, connected to the hollow tubes, and positioned at the second end of the guide means for picking an individual nail from each track, including:

a body positioned at the second end of the guide means and having a plurality of nail passages, each passage having an inlet adjacent one of the nail tracks, and an outlet connected to one of the hollow tubes;

slidable picker plate means, slidably mounted to the body, for connecting and disconnecting the nail tracks and the respective inlets of the nail passages; and means for moving the picker plate means from a first position in which a path between the second end of each track and the respective inlet is blocked to a second position in which the path is open to permit one nail to pass from the second end to the respective inlet, to cause nails from each nail track to be delivered to the respective nail passage;

nail sensing means for sensing nails in the tracks; and means for causing relative movement of the first end of the guide means and the outlet track to align selectively one of the plurality of nail tracks with the outlet track to permit selective filling of the nail tracks of the guide means based upon signals from the nail sensing means.

2. The apparatus of claim 1 wherein the vibrating feedbowl means and the guide means are supported generally above a frame.

3. The apparatus of claim 2 and further comprising: pivotal support means for pivotally supporting the guide means with respect to the frame.

4. The apparatus of claim 3 wherein the means for causing relative movement is connected to the guide means to cause pivotal movement of the guide means which moves the first end of the guide means with respect to the outlet track.

5. The apparatus of claim 1 wherein the nail delivery means further includes air supply means for supplying air which blows the nails through the tubes to the chucks.

6. The apparatus of claim 1 wherein the air supply means includes air nozzles aligned with the nail passages.

7. In a pallet-making machine, a bulk nail-feeding apparatus comprising:

feedbowl means for feeding nails in a single file along a path to a single outlet;

a plurality of nail tracks having a first end and a second end for guiding nails;

a plurality of nail driving means;

means for delivering nails from the plurality of nail tracks to the plurality of nail driving means, including:

nail pick means for picking individual nails from the nail tracks, comprising:

a body positioned at the second ends of the nail tracks and having a plurality of nail passages, each passage having a passage inlet adjacent one of the nail tracks, and a passage outlet;

slidable picker plate means, slidably mounted to the body, for connecting and disconnecting the nail tracks and the respective inlets of the nail passages; and means for moving the slidable picker plate means to cause nails from each nail track to be delivered to the respective nail passage; and nail delivery means for delivering the individual nails from the nail pick means to the nail driving means; and means for selectively connecting the nail tracks, one at a time, to the single outlet of the feedbowl means to maintain a supply of nails in each of the nail tracks.

8. The apparatus of claim 7 wherein the means for selectively connecting includes:

nail sensing means for sensing nails in the nail tracks; and means for causing relative movement of first ends of the nail track with respect to the outlet to permit selective filling of the nail tracks, one at a time, based upon signals from the nail sensing means.

9. The apparatus of claim 7 wherein nail delivery means includes hollow tubes connected between the nail pick means and the nail driving-means.

10. The apparatus of claim 9 wherein the nail delivery means further includes air supply means for supplying air which drives the nails through the tubes to the nail-driving means.

11. The apparatus of claim 10 wherein the air supply means includes air nozzles aligned with the nail passages.

12. In a pallet-making machine, a bulk nail-feeding apparatus comprising:

a plurality of nail tracks, having first and second ends, for guiding nails;

means for supply nails to the nail tracks;

a plurality of nail driving means;

nail pick means positioned at ends of the nail tracks for picking individual nails from the nail tracks, including:

a body positioned at the second ends of the nail tracks and having a plurality of nail passages, each passage having a passage inlet adjacent one of the nail tracks, and a passage outlet;

slidable picker plate means, slidably mounted to the body, for connecting and disconnecting the nail tracks and the respective inlets of the nail passages; and means for moving the slidable picker plate means to cause nails from each nail track to be delivered to the respective nail passage;

nail delivery means for delivering the individual nails from the nail pick means to the nail driving means;

a plurality of hollow tubes connected between the nail pick means and the nail driving means for delivering the individual nails from the nail pick means to the nail driving means; and air supply means operatively coordinated with the nail pick means for supplying air which drives the individual nails through the hollow tubes to the nail driving means.

13. The apparatus of claim 12 wherein the air supply means includes air nozzles aligned with the nail passages.

* * * * *

UNITED STATES PATENT AND TRADEMARK OFFICE
CERTIFICATE OF CORRECTION

PATENT NO. : 4,867,364

DATED : September 19, 1989

INVENTOR(S) : Roger W. Wallin et al.

It is certified that error appears in the above-identified patent and that said Letters Patent is hereby corrected as shown below:

Column 8, line 1, delete "supply" and insert --supplying--.

Signed and Sealed this

Twenty-fifth Day of December, 1990

Attest:

HARRY F. MANBECK, JR.

Attesting Officer

Commissioner of Patents and Trademarks